No. 779,360. PATENTED JAN. 3, 1905.
P. H. GRUMMANN.
ARTICULATING INSTRUMENT.
APPLICATION FILED AUG. 4, 1904.

Witnesses
A. L. Candy,
W. H. Bagnell

Inventor.
Paul Henry Grummann

No. 779,360. Patented January 3, 1905.

UNITED STATES PATENT OFFICE.

PAUL HENRY GRUMMANN, OF LINCOLN, NEBRASKA.

ARTICULATING INSTRUMENT.

SPECIFICATION forming part of Letters Patent No. 779,360, dated January 3, 1905.

Application filed August 4, 1904. Serial No. 219,546.

*To all whom it may concern:*

Be it known that I, PAUL HENRY GRUMMANN, a citizen of the United States, residing at Lincoln, in the county of Lancaster and State of Nebraska, have invented a new and useful Articulating Instrument, of which the following is a specification.

My invention supplies an aid to the learner in acquiring the correct pronunciation of German "ch," the German umlaut sounds "ö" and "ü," and all sounds requiring a similar protrusion of the lips. The learner by introducing the instrument in accordance with directions will produce the specified sounds correctly. The instrument clearly indicates the position of the organs of speech to the learner and with sufficient practice enables him to produce the specified sounds correctly without the aid of the same.

Figure 1:
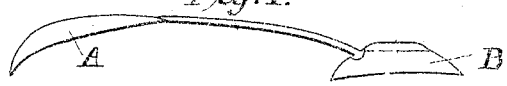

Figure 1 is a full-sized representation of the instrument, the part represented by A being used in pronouncing the German "ch," while the part designated by B is used in pronouncing the German umlaut sounds "ö" and "ü" and all other sounds which require a similar protrusion of the lips.

Figures 2, 4, 5:
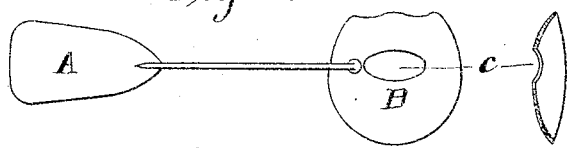
Figure 3:
Figure 6:
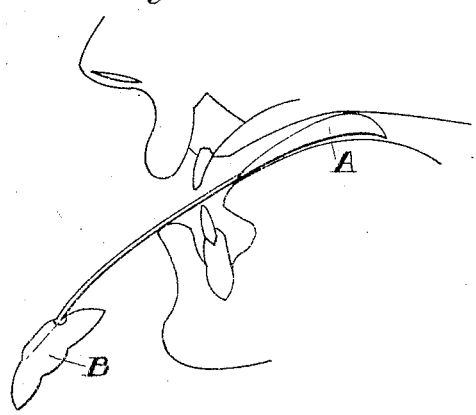

The part designated A in all figures is curved and its sides are raised, as indicated in Figs. 1 and 3, leaving a hollow portion in the center, as indicated in Fig. 4. A is inserted under the hard palate, as indicated in Fig. 6, care being taken that the teeth are about one-third of an inch apart, that the tip of the tongue touches the lower teeth, and that B, which serves as a handle in this case, is near the lower lip. In this manner the German "ch" is pronounced, various shades being produced by shifting the instrument backward and forward. The instrument can be withdrawn without difficulty and without interfering with the position of the tongue, thus enabling the learner to pronounce the sound independently.

Figure 7:
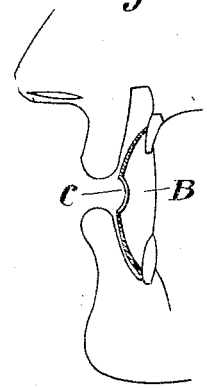

The part designated B in all figures is used in pronouncing sounds which require a protrusion of the lips. It is convex, as indicated in Figs. 1, 3, and 5, and contains an aperture, (indicated by *c* in Figs. 2, 3, 5, and 7.) It (B) is inserted in the middle of the mouth, as indicated in Fig. 7, between the lips and the teeth, the upper ridge of the instrument touching the upper edge of the upper teeth. The stem of the instrument projects to the right, and A now serves as a handle. The teeth are kept about one third of an inch apart and the lips cover the instrument up to the edges of the aperture *c*, as partially shown in Fig. 7. The learner is instructed to pronounce English "a" (German "e") and produces the desired German "ö," or he is instructed to pronounce English "e" (German "i") and produces the desired German "ü." Similarly the learner can be trained to pronounce the whole series of sounds that require the protrusion of lips. (Indicated in Fig. 7.)

The instrument is constructed of metal, hard rubber, or any substance sufficiently firm to preserve its shape. The part indicated by A may also be perforated or constructed of wire, thus giving the learner a better idea of the position of the tongue during articulation.

What I claim as my invention, and desire to secure by Letters Patent, is—

An instrument to aid in pronunciation, consisting of two thin plates; one of which is oval, the broad end being deflected and its sides raised in a direction opposite to said deflection; another plate, in the form of a conventionalized shield, being convex and containing slightly above its center an elliptic aperture, the edges of which are slightly raised above the body of the plate; and a stem which extends from the narrow end of the oval plate to the end of the elliptic aperture of the other, being fastened on the convex side, all substantially as set forth.

In testimony whereof I have signed my name to this specification in the presence of two subscribing witnesses.

PAUL HENRY GRUMMANN.

Witnesses:
  W. H. BAGNELL,
  A. L. CANDY.